United States Patent
Signer

Patent Number: 5,913,324
Date of Patent: Jun. 22, 1999

[54] APPARATUS FOR INJECTING ADDITIVES INTO A FLOW OF A HIGHLY VISCOUS LIQUID

[75] Inventor: Arno Signer, Wiesendangen, Switzerland

[73] Assignee: Sulzer Chemtech AG, Winterthur, Switzerland

[21] Appl. No.: 08/939,371

[22] Filed: Sep. 29, 1997

[30] Foreign Application Priority Data

Oct. 23, 1996 [EP] European Pat. Off. .............. 96810704

[51] Int. Cl.$^6$ ....................................................... F17D 1/17
[52] U.S. Cl. ............................... 137/3; 137/897; 137/896
[58] Field of Search ............................... 137/896, 3, 897, 137/889, 893, 898

[56] References Cited

U.S. PATENT DOCUMENTS

| | | | |
|---|---|---|---|
| 1,626,487 | 4/1927 | Warren | 137/889 |
| 3,601,318 | 8/1971 | Gehring et al. | 137/893 X |
| 3,735,778 | 5/1973 | Garnier | 137/896 |
| 3,739,794 | 6/1973 | Lindgren | 137/897 X |
| 3,791,410 | 2/1974 | Sapiano | 137/893 X |
| 4,483,805 | 11/1984 | Glindsjo | 137/896 |
| 4,753,535 | 6/1988 | King | |
| 4,917,152 | 4/1990 | Decker | |
| 5,067,508 | 11/1991 | Lee | 137/896 |
| 5,165,441 | 11/1992 | Mitchell | 137/896 |
| 5,176,448 | 1/1993 | King | |
| 5,192,269 | 3/1993 | Poli | 137/896 |
| 5,388,906 | 2/1995 | Rao | |

OTHER PUBLICATIONS

Patent Abstracts of Japan, vol. 95, No. 004 & JP 07 100825 A (Denki Kagaku Kogyo KK), Apr. 18, 1995, Abstract.

*Primary Examiner*—Denise L. Ferensic
*Assistant Examiner*—Ramyar Farid
*Attorney, Agent, or Firm*—Townsend and Townsend and Crew LLP

[57] ABSTRACT

The apparatus for injecting one or more additives (4) into a flow (5) of a highly viscous liquid into which the additives are to be admixed comprises a supply member (3) for each additive. This supply member is releasably connected to a tube section (2) conducting the flow. Each of the supply members has a supply channel (30) for the additive which stands transversely to the direction of flow. The additives temporarily form separate phases which coexist with the phase of the highly viscous liquid after having been fed in. A wall section (1) which is oriented in the direction of flow and can be flowed about on both sides by the highly viscous liquid is associated in each case with at least some of the injection members. Its inner side (10), that lying nearer the center of the tube, spans a surface on which the exit opening (35) of the supply member at least approximately lies. The wall section is provided downstream from the discharge opening as a spreading means (11) for the additive supplied.

9 Claims, 3 Drawing Sheets

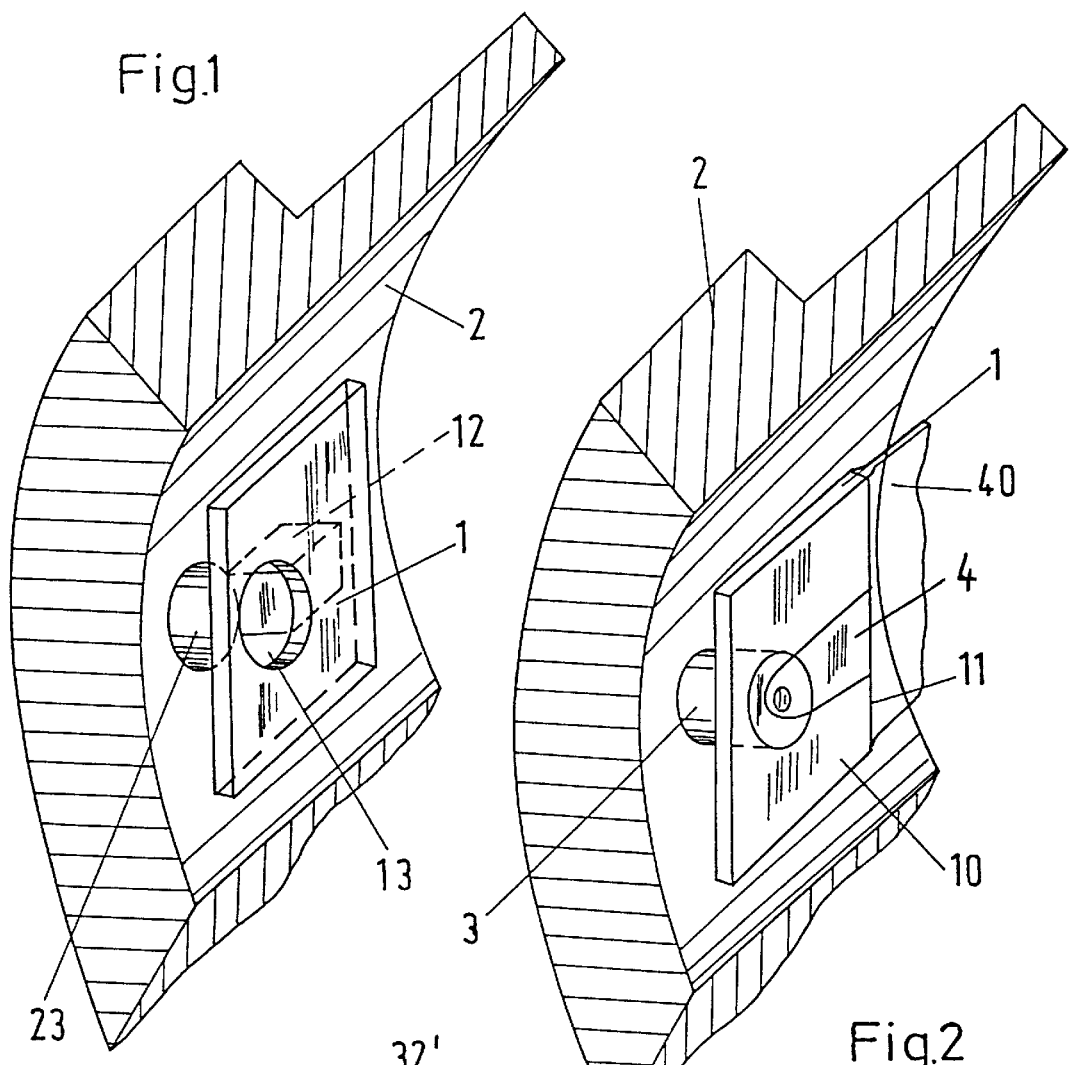
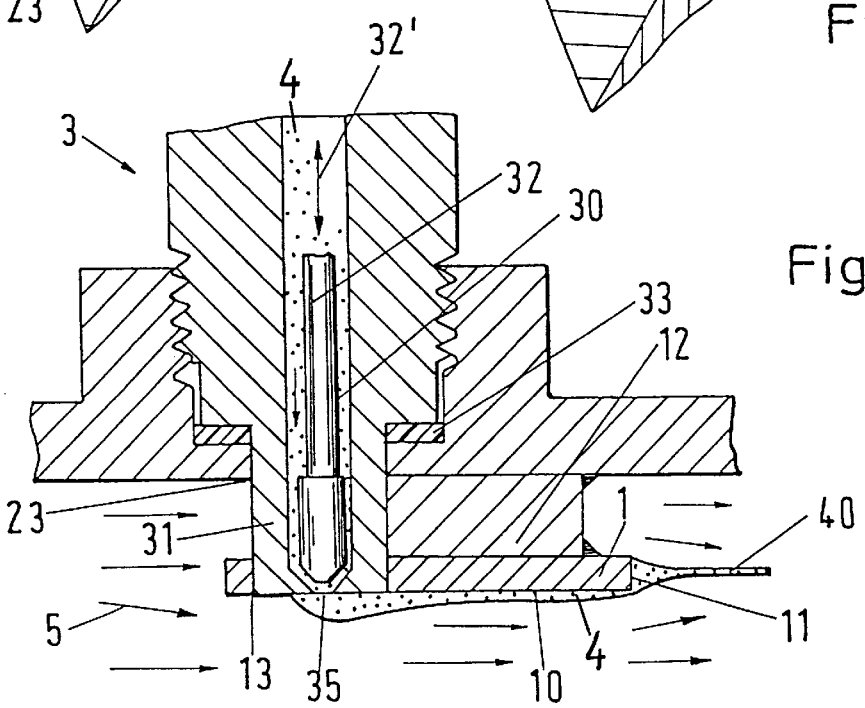

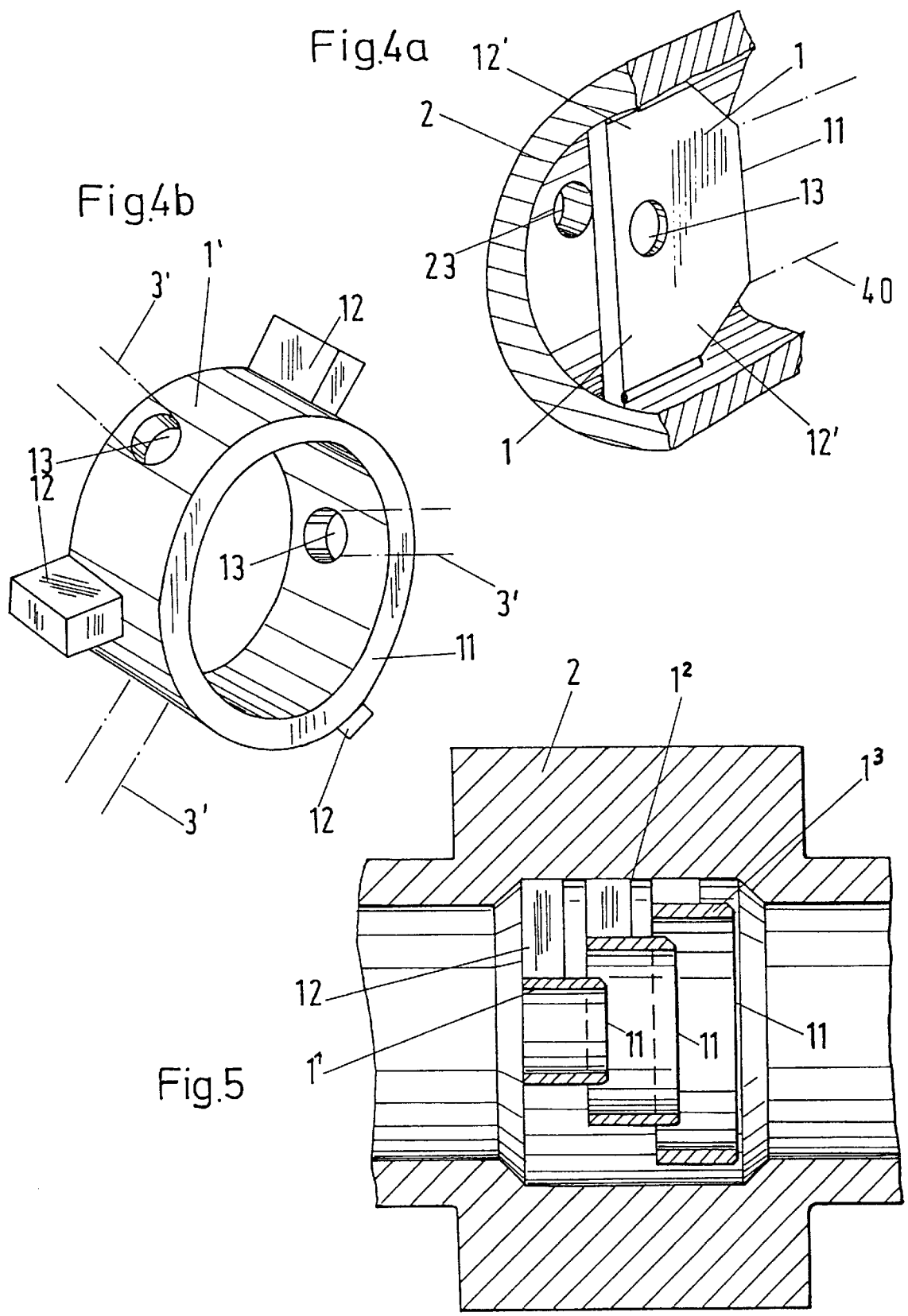

APPARATUS FOR INJECTING ADDITIVES INTO A FLOW OF A HIGHLY VISCOUS LIQUID

BACKGROUND OF THE INVENTION

The invention relates to an apparatus for injecting additives into a product flow formed by a highly viscous liquid. The invention also relates to a plant with an apparatus of this kind as well as to a method or process which can be performed using the plant.

The highly viscous liquid envisaged is in particular a polymer melt; the additives are low viscosity liquids, in particular lubricants (namely stearates, alcohols, paraffin oils, softeners) which are to be worked into the polymer melts. The difference in viscosities between the melts and the additives is as a rule very large; the viscosities can differ by a factor on the order of magnitude of two or more powers of ten.

When mixing lubricants into a polymer melt, the former must eventually enter homogeneously distributed into solution. As a rule a proportion of about 0.1 to 6% of dissolved lubricants is provided. A lubricant acts as a partition agent, for example during the injection molding of polymers, which develops its action when the products are being demolded, i.e. removed from the injection tool or mold. The admixing is preferably performed by means of static mixers. A plant is known from JP-A 07 100 825 (see PATENT ABSTRACTS OF JAPAN vol. 950 no. 4) in which a thermoplastic polymer and a liquid additive are mixed by means of static mixers. During this, a bypass flow is formed; the additive is introduced into it; and it is mixed in with an additional static mixer. This first mixture is fed into the main flow upstream of a main mixer so that a homogeneous mixture arises subsequently in the main mixture.

If only one additive must be mixed into a highly viscous liquid flow and it suffices to use only one supply member, the opening of the supply member can be arranged in such a manner that additive enters in the axial direction and centrally into the liquid flow. The admixing takes place without problems. If, on the other hand, the infeed is performed radially, the additive, which is present as a separate liquid phase, is transported to the tube wall—as has been shown in experiments—apparently as a result of hydrodynamic forces. A deposit can form at the tube wall through coalescence of the additive or other unfavorable effects can occur which impair or render the desired mixing impossible.

In many cases the use of a plurality of injection members is required, in particular when different additives must be mixed into the polymer or when supply members are provided as reserves in order to be able to maintain operation when individual supply members fail through replacement by reserve members. In these cases, as a rule, radial supply of the additives is required, i.e. supply members with one supply channel each standing transversely to the direction of flow. This results in the above named problems. It is thus the object of the invention to provide a supply device with radial infeeds for additives in which the formation of deposits and other unfavorable effects do not occur.

SUMMARY OF THE INVENTION

The apparatus for the infeed of additives into a product flow formed by a highly viscous fluid into which the additives are to be admixed comprises an infeed member for each additive to be injected. This is releasably connected to a tube section conducting the product flow. The infeed members each have a supply channel for the additive which stands transversely to the direction of flow. After the infeed the additives temporarily form separate phases which coexist with the phase of the highly viscous liquid. A wall section oriented in the direction of flow and about which the highly viscous liquid can flow on both sides is associated in each case with at least some of the supply members. Its inner side, that which lies closer to the center of the tube, spans a surface on which the exit opening of the supply member at least approximately lies. Downstream from the exit opening the wall section is arranged as a spreading means for the additive supplied.

The flow of the product on both sides of the wall section results in the supplied additive being embedded between streamlines of the product flow. In this way the additive does not come into contact with the wall of the tube section conducting the product flow and the unfavourable effects named above do not occur.

BRIEF DESCRIPTION OF THE DRAWINGS

FIG. 1 illustrates a section of an apparatus in accordance with the invention with a wall piece provided as a spreading-out means and with the supply member removed, FIG. 2 illustrates the section corresponding to FIG. 1 with an injection member giving off an additive, FIG. 3 illustrates a longitudinal section through the head of an injection member which is shown in cooperation with the apparatus in accordance with the invention, FIG. 4a illustrates a planar wall section which is fastened to the tube wall at its sides, FIG. 4b illustrates a ring-shaped wall section, FIG. 5 illustrates a longitudinal section through a special embodiment of the apparatus in accordance with the invention.

DESCRIPTION OF THE PREFERRED EMBODIMENTS

Figure 6:
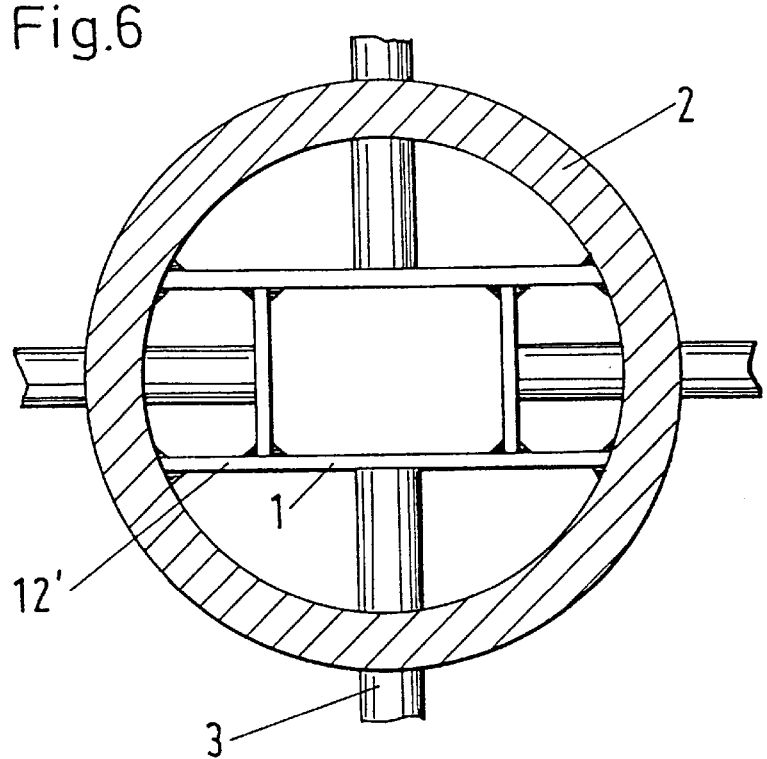
FIG. 6 is a cross-section through a further embodiment.

The components of the section of the apparatus in accordance with the invention shown in FIG. 1 are as follows: A wall section 1 for the preliminary distribution of a supplied additive in a flow of a highly viscous liquid; a tube section 2 conducting the flow; and a connection piece 12 by means of which the wall section 1 is fastened to the tube section 2. A supply member 3 for the additive 4—see FIGS. 2 and 3—is missing in FIG. 1. The wall section 1 has a bore 13 for the mouth 31 of the supply member 3. An aperture 23 is arranged in the tube section 2 for the injection member 3 into which the member 3 can be releasably inserted.

FIG. 2 shows the supply of the additive 4, with the flow of the highly viscous liquid not being shown. The supply channel 30 of the supply member 3 stands transversely to the direction of flow. The wall section 1 is oriented in the direction of flow and the highly viscous liquid flows about both sides of the wall section. The inner side 10 of the wall section 1 spans a surface on which the exit opening 35 of the supply channel 30 lies. Under the hydrodynamic influence of the flow the additive spreads out downstream on the wall section 1 and in particular along the tail edge 11 and is subsequently embedded, for example as a trail (or in the form of droplets), into the liquid flow, in which it finally passes into solution through diffusion and under the action of non-illustrated static mixers.

The supply member 3 can, as is shown in FIG. 3, be screwed into the tube section 2. Further, not yet named components are: a sealing ring 33 and a needle 32 by means of which the injection of the additive 4 can be regulated (regulatory movement indicated as a double arrow 32'). The flow of the highly viscous liquid 5 is indicated by long arrows, the flow of the additive 4 by short arrows.

FIG. 4a shows a section of an apparatus in accordance with the invention in which a wall section 1 is fastened at its sides 12' to the tube wall 2. The part of the wall section 1 lying downstream is made in the shape of a trapezoid so that the tail edge 11 does not lead the additive up to the tube wall 2 and the trail 40 flowing away remains restricted to an inner region of the liquid flow.

The wall section 1 can be straight, as shown in FIGS. 1 to 4a, or curved. A ring-shaped wall section 1' is illustrated in FIG. 4b with which three injection members—indicated in chain dotted lines 3'—are associated. The ring 1' is fastened to the non-illustrated tube section 2 by three connecting pieces 12.

The longitudinal section of FIG. 5 shows three ring-shaped wall sections $1^1$, $1^2$, $1^3$ which are arranged concentrically, with a wall section $1^1$ or $1^2$ that lies closer to the center of the tube lying upstream ahead of the adjacent wall section $1^2$ or $1^3$ respectively that lies further outwardly. The wall sections $1^1$, $1^2$ and $1^3$ can also be arranged at the same level. A static mixer can also be arranged in the open inner space of the wall section $1^3$, for example.

FIG. 6 shows a cross-section through the tube section 2 with a plan view of four wall sections 1 with four associated supply members 3. In this exemplary embodiment the wall sections 1 are built up of plates in such a manner that parts of these plates produce the firm connections to the tube section 2. The two wall sections 1 fastened to the tube wall 2 are advantageously shaped as in the example shown in FIG. 4a.

The wall sections 1 of the apparatus in accordance with the invention have a further advantageous effect. They support the head 31 of the supply members 3 so that the latter need not be constructed very massively in order to be able to counteract a deformation through the pressure forces arising in the flowing liquid.

Figure 7:
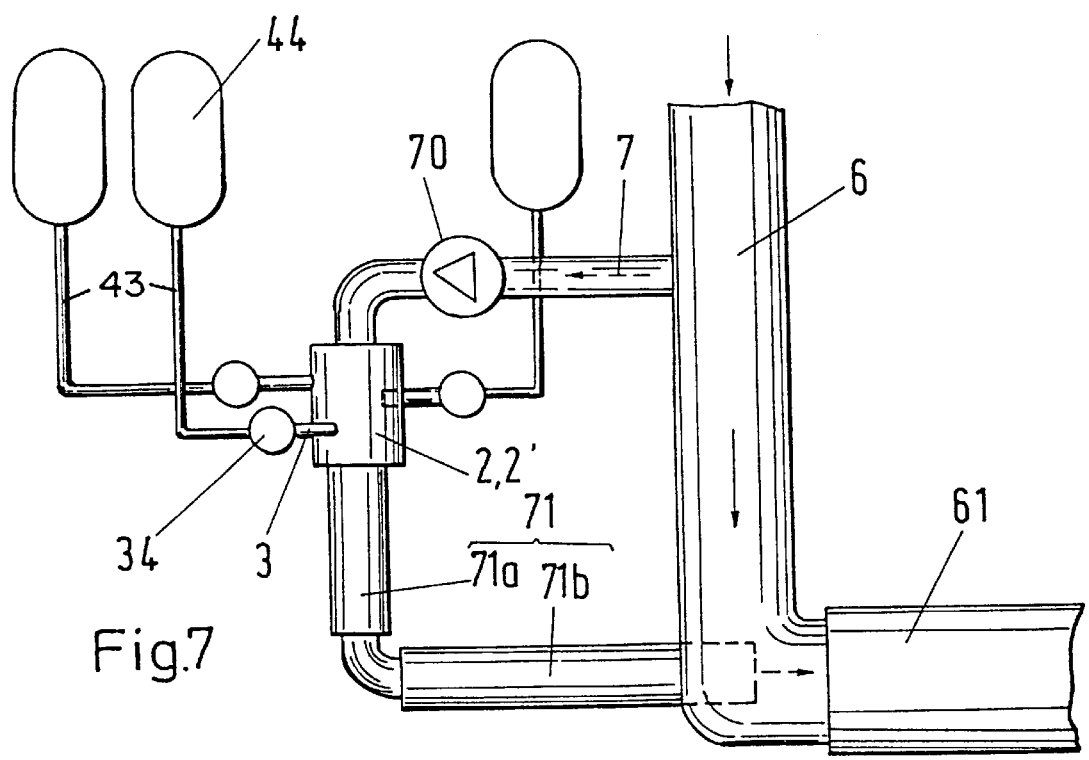
FIG. 7 illustrates a plant in accordance with the invention.

FIG. 7 shows a plant with an apparatus 2' in accordance with the invention which is arranged in a bypass line 7. A pump 70 forwards a small portion of the highly viscous liquid to be treated out of a main line 6 to the apparatus 2'. Subsequently a line section with a static mixer 71 (or static mixers 71a, 71b) produces a connection to the main line 6, with the bypass line 7 discharging into the main line 6 ahead of a static mixer 61. The additives are fed in from reservoirs 44 through lines 43 by means of metering devices 34 and into the apparatus 2' through the supply members 3.

I claim:

1. A method for injecting and admixing at least one additive into a product flow formed by a highly viscous liquid in a tube section having at least one aperture, the tube section including therein at least one wall section spaced from an inner surface of the tube section and oriented in the direction of the product flow in the tube section, the at least one wall section having at least one bore and having a flat inward facing surface defining a plane disposed closer to a center of the tube section than an outward facing surface, at least one supply member each extending through one of the at least one aperture for injecting the at least one additive, each of the at least one supply member having a discharge opening coupled to one of the at least one bore of the at least one wall section, wherein said discharge opening lies on said plane, the method comprising the steps of:

conducting the product flow on both the inward facing surface and the outward facing surface of the at least one wall section in the tube section; and injecting the at least one additive via the at least one supply member out the discharge opening through the at least one bore of the at least one wall section into the product flow transversely to the direction of the product flow, the at least one additive spreading out downstream on the inward facing surface of the at least one wall section and forming a trail so as to be embedded into the product flow and pass homogeneously distributed into the product flow through diffusion, the highly viscous liquid having a viscosity higher than a viscosity of each of the at least one additive by a factor on the order of magnitude of two or more powers of ten, wherein the highly viscous liquid comprises a polymer melt.

2. The method of claim 1 wherein the at least one additive comprises a lubricant.

3. The method of claim 1 further comprising the step of regulating the injecting of the at least one additive.

4. The method of claim 1 further comprising the step of fastening the at least one supply member to the inner surface of the tube section via at least one connecting element.

5. The method of claim 1 wherein the at least one wall section is associated with a plurality of supply members.

6. The method of claim 1 wherein the at least one wall section comprises a plurality of wall sections including plates which provide firm connections for fastening the wall sections to the inner surface of the tube section.

7. The method of claim 1 wherein the at least one wall section includes a trapezoidal-shaped wall section having a trapezoidal portion in a downstream region of the wall section.

8. A method for injecting and admixing at least one additive into a product flow formed by a highly viscous liquid in a tube section having at least one aperture, the tube section including therein at least one wall section spaced from an inner surface of the tube section and oriented in the direction of the product flow in the tube section, the at least one wall section having at least one bore and having a flat inward facing surface defining a plane disposed closer to a center of the tube section than an outward facing surface, at least one supply member each extending through one of the at least one aperture for injecting the at least one additive, each of the at least one supply member having a discharge opening coupled to one of the at least one bore of the at least one wall section, wherein said discharge opening lies on said plane, the method comprising the steps of:

conducting the product flow on both the inward facing surface and the outward facing surface of the at least one wall section in the tube section; and injecting the at least one additive via the at least one supply member out the discharge opening through the at least one bore of the at least one wall section into the product flow transversely to the direction of the product flow, the at least one additive spreading out downstream on the inward facing surface of the at least one wall section and forming a trail so as to be embedded into the product flow and pass homogeneously distributed into the product flow through diffusion, where in the highly viscous liquid comprises a polymer melt and the at least one additive comprises a lubricant.

9. A method for injecting and admixing at least one additive into a product flow formed by a highly viscous liquid in a tube section having a plurality of apertures, the tube section including therein a plurality of ring-shaped wall sections having different inner diameters and being arranged concentrically, the plurality of ring-shaped wall sections being spaced from an inner surface of the tube section and oriented in the direction of the product flow in the tube section, the plurality of ring-shaped wall sections including a first wall section lying closer to the center of the tube section arranged upstream of an adjacent wall section lying further from the center of the tube section than the first wall section, each of the plurality of ring-shaped wall sections having at least one bore and having an inward facing surface disposed closer to a center of the tube section than an outward facing surface, a plurality of supply members each extending through one of the plurality of apertures for injecting the at least one additive, each of the plurality of supply members having a discharge opening coupled to one of the at least one bore of the plurality of ring-shaped wall sections, the method comprising the steps of:

conducting the product flow on both the inward facing surface and the outward facing surface of each of the plurality of ring-shaped wall sections in the tube section; and injecting the at least one additive via the plurality of supply members out the discharge openings through the at least one bore of each of the plurality of ring-shaped wall section into the product flow transversely to the direction of the product flow, the at least one additive spreading out downstream on the inward facing surface of each of the plurality of ring-shaped wall sections and forming a trail so as to be embedded into the product flow and pass homogeneously distributed into the product flow through diffusion.

* * * * *